(No Model.)
D. KLINE.
HAY MANGER.
No. 376,529. Patented Jan. 17, 1888.
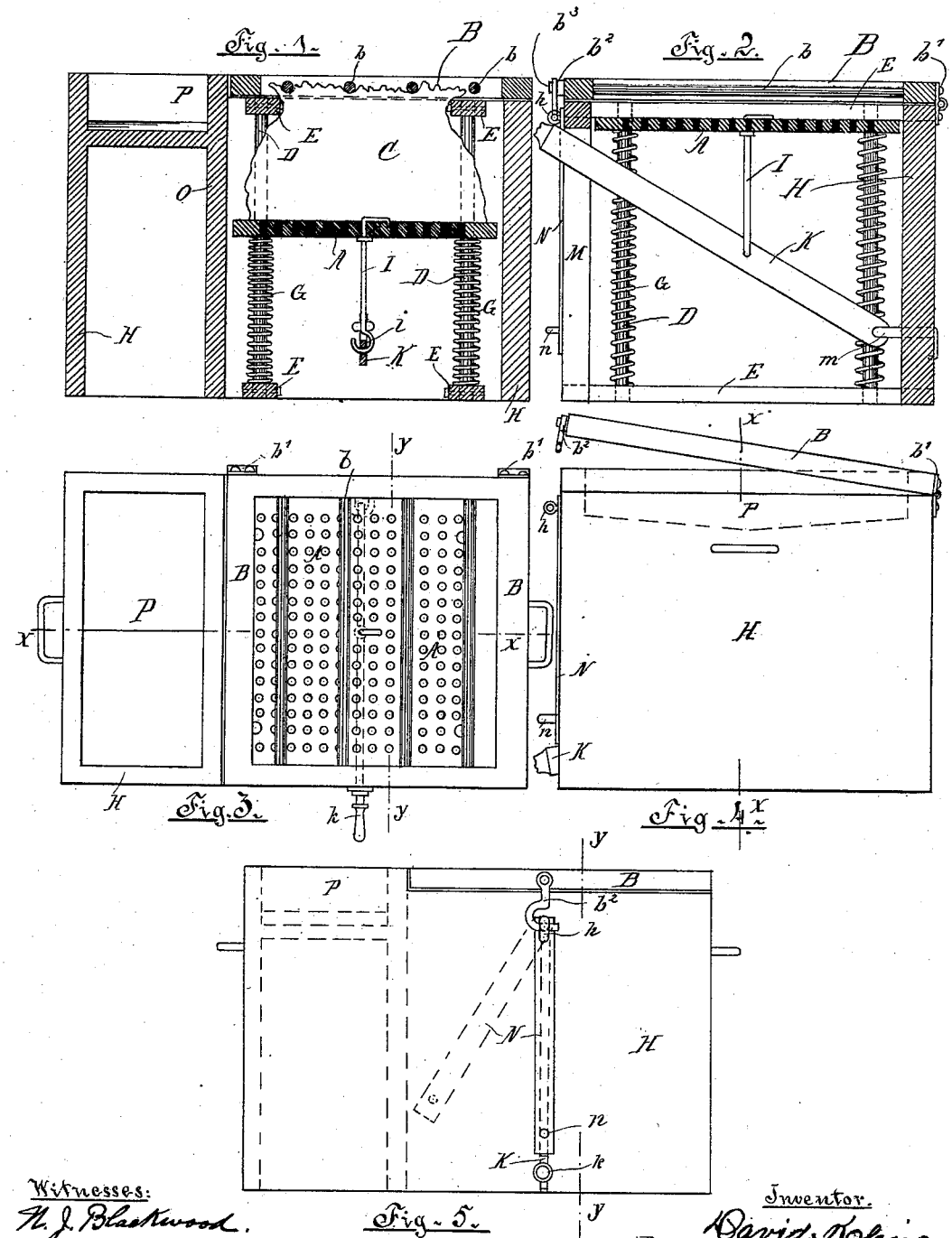

UNITED STATES PATENT OFFICE.

DAVID KLINE, OF HIGHVILLE, PENNSYLVANIA.

HAY-MANGER.

SPECIFICATION forming part of Letters Patent No. 376,529, dated January 17, 1888.

Application filed September 14, 1887. Serial No. 249,707. (No model.)

*To all whom it may concern:*

Be it known that I, DAVID KLINE, of Highville, in the county of Lancaster and State of Pennsylvania, have invented certain new and useful Improvements in Hay-Mangers; and I do hereby declare the following to be a full, clear, and exact description of the invention, such as will enable others skilled in the art to which it appertains to make and use the same.

This invention relates to devices for supplying horses and cattle with food and water. The means ordinarily used for this purpose are objectionable in consequence of the hay being supplied to the animal from a rack in such an elevated position that the dust and fine particles are being inhaled by the animal, often causing diseases that entail suffering to the animal and loss to the owner, to say nothing of the great waste resulting from the hay being pulled down by the animal and getting mixed with the bedding. Furthermore, the appliances now in use are permanent fixtures of the stall and cannot be given the benefit of sun and air, and, as is often the case, part of the food is often lodged in the trough in angles and corners that cannot be reached by the animal, such material by fermentation becoming not only offensive, but a fruitful source of disease.

This invention consists, mainly, of a portable base or receptacle for containing a supply of hay, also water or food other than hay, said box or receptacle being provided with handles for convenience in moving.

This invention has for its object preventing waste of material, obviating inhalation of dust by the animal while feeding, and adaptation for removal from the stable, for reasons set forth.

In the drawings which accompany and form part of this specification similar letters refer to similar parts throughout the several views.

Figure 1 is a vertical section through $x\ x$, Fig. 3; Fig. 2, a similar section through $y\ y$, Fig. 3. Fig. 3 is a top view, Fig. 4 a side view, and Fig. 5 a front view.

H is the box, of rectangular formation, having therein a space, C, for storage of hay, and trough P, for water or food other than hay, the bottom of said trough being depressed in the center to permit any remaining water to settle in that portion. A frame, B, is hinged at its back edge, $b'$, to box H, and provided at its front edge with a retaining-hook, $b^2$. Said frame is further provided with rack-bars $b$. It may be raised on its hinges for the purpose of filling the hay-space C beneath it. Below this space C is a perforated movable bottom, A, which allows dust and fine particles to sift through it and fall to the floor beneath. Four upright cylindrical guide-bars, D, extend through the bottom A and allow said bottom to be forced down along them against the resistance of springs G, which surround said guide-bars. Said springs are adapted to exert a continuous upward pressure on said bottom A, holding the hay always up against rack-bars $b\ b$. Said movable bottom A is adapted for depression for the purpose of refilling space C with hay by a lever, K, fulcrumed at back of box H and pivoted to a drop, I, extending down from the lower side of movable bottom A, the free end of said lever K extending slightly through slot in front of box H for convenience in manipulating.

A retaining-pawl, N, is pivoted by one end to the upper part of the front of box H. The other end of said pawl drops by its own weight on the movable end of lever K and holds the latter in its lowest position until released by hand. This will ordinarily be done after the space C is supplied with hay.

Having thus described my invention, what I claim as new, and desire to secure by Letters Patent, is—

The combination of the bottom A, guide-rods D, springs G, lever K, hanging post I, and pawl N, with a frame, H, inclosing a hay-space above said bottom, substantially as set forth.

In testimony whereof I have hereunto subscribed my name in the presence of two subscribing witnesses.

DAVID KLINE.

Witnesses:
A. F. SHENCK,
J. S. BITNER.